Dec. 15, 1942.  H. HEUSER  2,305,423
APPARATUS FOR MAKING SILAGE
Filed Nov. 16, 1940
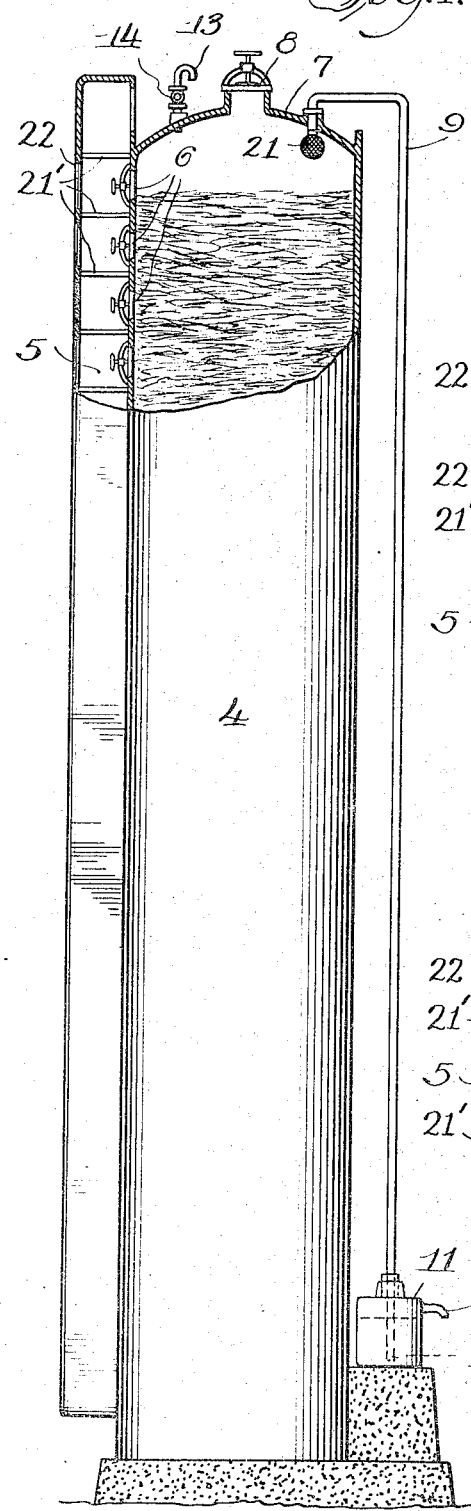
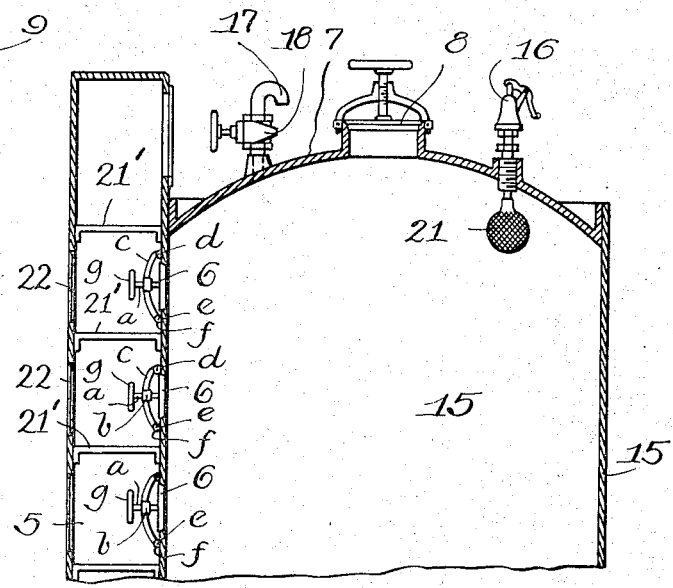
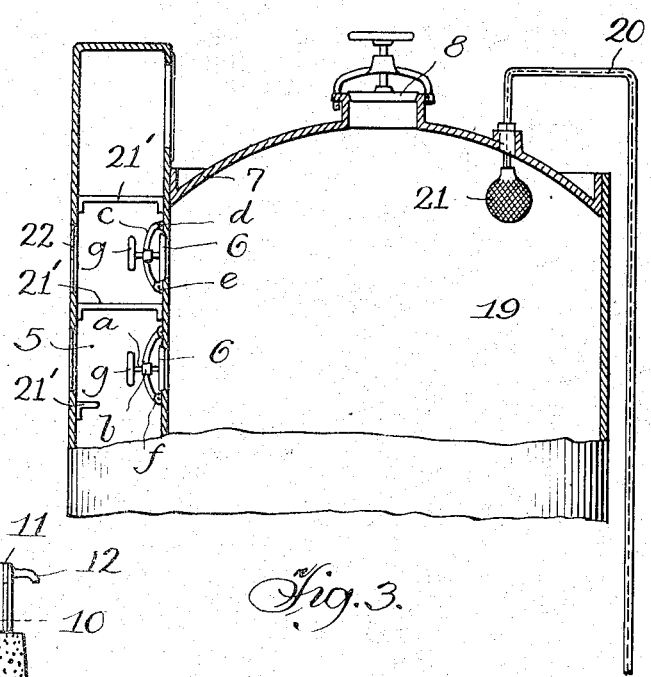
INVENTOR.
Herman Heuser
BY Parkinson & Lane
Attys.

Patented Dec. 15, 1942

2,305,423

UNITED STATES PATENT OFFICE 2,305,423

APPARATUS FOR MAKING SILAGE

Herman Heuser, Evanston, Ill.

Application November 16, 1940, Serial No. 365,880

2 Claims. (Cl. 99—235)

The present invention relates to the making of silage such as corn silage and the like, and it consists in a new apparatus for making the same.

As usually is the case, the silage in the top of a silo spoils to a considerable depth within a short time after the silo has been filled up. This is due to the air in the top of the silo furnishing the oxygen required for the growth of mould fungi.

And as usually is the case, the silage around the silo chute doors is also more or less spoiled due to the chute doors being not air tight, letting out the gas, that is to say, carbon dioxide, during the fermentation of the silage, and letting in the air after the fermentation is over.

The main object of my invention is to carry out the silage making so that there is no spoilage of silage in the top of the silo and at the silo doors.

A further object is to do this in a simple manner and at a negligible expense.

A still further object is to improve the silage throughout the entire mass of silage.

Other objects, advantages and capabilities will later more fully appear.

My invention further resides in the combination, construction and arrangement of parts illustrated in the accompanying drawing, and while I have shown therein a preferred embodiment I wish it understood that the same is susceptible of modification and change without departing from the spirit of my invention.

In the drawing:

Fig. 1 is a side elevation of a silo embodying my invention, a portion of the top being shown in section on a median vertical plane for the sake of clearness.

Fig. 2 is a fragmentary vertical section, taken on a median plane, of the upper portion of my silo.

Fig. 3 is a view similar to Fig. 2 but showing a somewhat different means for carrying the gas from the top of the silo to the atmosphere.

I have discovered that the spoilage of the silage is prevented by working with a silo that is hermetically sealable and that is provided at the top with means for carrying off the gas, mostly $CO_2$, produced during the fermentation of the silage.

In the following I will describe how a silo should be equipped to be suitable for carrying out my invention:

Referring more in detail to the drawing, Fig. 1 shows a silo with its top portion illustrated in vertical section. The silo consists of a closed tank 4 made of any suitable material and provided with a chute 5 having doors 6 on the order of manhole doors in use for gas tanks, and which are hermetically sealable. The doors 6 are formed in the silo side wall to form passageways from the interior of the silo to the interior of the chute when the doors are open, and which doors may be closed and hermetically sealed by gaskets or other sealing means when desired. As seen in Figs. 2 and 3, these doors carry the outwardly extended threaded stem a threaded through the nut b forming part of the outwardly bowed arm c which, if desired, may be pivotally mounted at d to a lug on the silo wall and provided at its lower end with holes and a removable pin e inserted into complemental holes in a lug f. When the pin e is in place the door 6 may be sealed shut by rotating hand wheel g in the appropriate direction, or the door may be opened by rotating the hand wheel in the opposite direction and, if desired, the pin e may be then removed and the door swung further open on its pivot d. I do not wish to be limited to this particular door as any other form of door that may be sealed tight and when opened give sufficient accessibility may be used. The steps, ladder rungs or the like 21' in chute 5 extend up to the silo roof 7, which is provided with a sealable manhole door 8 of the gas tank type, more or less similar to the doors 6. There is inserted in the silo roof 7 of silo 4 a pipe 9 for carrying off the gas produced by the fermentation of the silage. Pipe 9 is sealed at its end 10 by a liquid contained in vessel 11, which communicates through pipe 12 with the atmosphere. The pipe 9 reaches so far into the liquid as to produce a resistance equal to a pressure, which the silo walls can easily stand, say to a pressure of eight ounces. The sealing liquid may be water but usually it is a non-freezing liquid such as brine (a solution of salt in water). Silo 4 is further provided with a pipe 13 equipped with valve 14 for reducing the gas pressure in the silo to the pressure of the atmosphere, before the silo is to be opened for feeding the silage therein to the cattle or other farm animals.

Fig. 2 shows a silo 15 with hermetically sealable chute doors and a hermetically sealable roof door (similar to the silo of Fig. 1) but provided with one or more blow-off valves 16 of which only one is shown, which opens when the pressure in the silo has increased to say eight ounces, and which closes again when the pressure in the silo has decreased to say six ounces. Silo 15 is also equipped with a pipe 17 operated by valve 18 for reducing the pressure in the silo to the pressure of the atmosphere when the silo is to be opened.

Fig. 3 shows a silo which is equipped with hermetically sealable chute doors and roof door similar to Figs. 1 and 2, but also provided with a gas carrying pipe 20 having no liquid seal but having a diameter so small that during the fermentation of the silage a pressure is produced in the silo not exceeding eight ounces.

As indicated in the drawing, the gas pipes 9 and 20, and blow-off valve 16, have a bulb screen 21 or any other suitable perforated contrivance screwed onto them in the silo to prevent them from being clogged up by silage particles during the filling of the silo.

Each silo chute has a sufficient number of windows 22 placed all the way up to the top chute door in the wall opposite the chute doors. This admits light into the chute from which the light passes into the silo, when a chute door is open during the filling of the silo or during the emptying of the silo.

In the following I will describe a method suitable to carry out my invention:

Fresh cornstalks with the ears on them, or other suitable silage material, are cut up and blown by a silo filler (not shown) through a tube line (not shown) into the silo 4 by way of door 8. As the silo is being filled with the material the doors 6 in chute 5 are hermetically sealed one after the other. The silo is filled to just below the top door of the chute in the usual manner. After the man who distributed and tramped down the silage during the filling of the silo has left the silo, the top door 6 of the chute and the door 8 on top of the silo roof are likewise hermetically sealed.

The gas produced by the fermentation of the silage passes through pipe 9 into the liquid of vessel 11 and thence into the atmosphere with a pressure of eight ounces equal to the resistance of the liquid in the vessel to the passage of the gas through it, taking along at the start the air that was in the top of the silo. Therefore, mould fungi can not grow in the top silage for want of air and, as there is no leakage at any of the chute doors or the door in the silo top, there is no spoilage of silage anywhere in the silo.

When the fermentation of the silage has come to an end, as can be seen at the outlet of pipe 12 of vessel 11, globe valve 14 is opened whereby the gas pressure in the silo is reduced to the pressure of the atmosphere. Thereupon, the top door of the silo chute is opened, whereby the remainder of the gas in the top of the silo dropping down the silo chute is replaced by air. After all the gas in the top of the silo has been replaced by air, the silage is ready for use.

There is no particle of spoiled silage, the silage at the top is in first-class condition like the silage beneath, which is much more succulent and possessing a much better flavor than usually is the case, because of the unusually great preserving effect of carbon dioxide absorbed by the whole mass of silage to a much larger extent than usually is the case.

The method of making silage in the silo 15 shown in Fig. 2 is the same as described aforesaid, with the difference that the gas produced during the fermentation of the silage is blown off into the atmosphere through blow-off valve 16 which opens when the pressure in the silo is eight ounces and closes again when the pressure in the silo is six ounces. When the fermentation has come to an end, as can be seen when there is no more gas blown off, then globe valve 18 is opened to reduce the pressure of the gas in the silo to that of the atmosphere. Thereupon, the top door of the silo chute is opened to remove the remainder of the gas from the top of the silo.

The method of making silage in silo 19 of Fig. 3 is the same as described aforesaid, but with this difference that the gas is carried into the atmosphere by a pipe 20 having a diameter of a size small enough to cause the production of a pressure in the top of the silo that does not exceed eight ounces during the fermentation of the silage but drops to the pressure of the atmosphere when the fermentation of the silage has come to an end. During the fermentation the silage is separated from the atmosphere by the gas filling up the top of the silo and the gas passing under pressure through the gas pipe, but after the fermentation is over the silage is separated from the atmosphere only by the gas in the top of the silo.

While the gas pressure in the three silos has, for illustrative purposes, been limited in the examples to eight ounces, a somewhat higher pressure may be employed for carrying out my invention, for the higher the gas pressure is in the silo the greater is the preserving effect of the gas upon the silage.

The silage in silo 4 and in silo 15 does not need to be used at once after the fermentation of the silage has been completed. It can be left standing in the hermetically sealed silos for some time, for the carbonic acid in the silage and in the space above the silage preserves the silage for a long time. But after the silos have been opened the silage therein should be used very soon.

The invention is applicable in the making of silage from any suitable material besides cornstalks with the ears on them, such as sorghums or a legume such as freshly mowed alfalfa, with which, however, a small amount of molasses should be mixed to increase the carbohydrate content of the alfalfa.

As seen, there is no valve in the gas pipe of silos 4 and 19, which makes it sure that the pressure in the silos can not be increased by tampering with a valve.

Having now described my invention, I claim:

1. In combination a silo comprising walls that are air tight except for a vertical series of doors in a side wall and a filling door in the top wall, means for keeping all of said doors hermetically sealed when the silage is fermenting, means for preventing escape of the gas above the silage until it has reached a desired pressure, and means to cause the escape of any gas in the silo in excess of said desired pressure, whereby to produce ensilage of great succulence, flavor and preservation.

2. In combination, a silo comprising walls that are air tight except for a vertical series of doors in a side wall and a filling door in the top wall, means for removably holding said doors hermetically sealed relative to the silo walls when the silage is fermenting, means in the top of the silo for holding the pressure above the silage until it has reached a certain amount and then releasing only that pressure in excess of said certain amount, said means in the top of the silo being a blow-off valve which keeps the amount of pressure held in the silo below that which would be harmful to the silo walls, and means for reducing the pressure in the silo to the pressure of the atmosphere when desired.

HERMAN HEUSER.